United States Patent [19]
Deppi

[11] Patent Number: 5,940,164
[45] Date of Patent: Aug. 17, 1999

[54] EYEGLASS FRAME AND METHOD OF MOUNTING LENS THEREIN

[75] Inventor: Gianni Deppi, Domegge Di Cadore, Italy

[73] Assignee: Neometal Optik International S.R.L., Donegge Di Cadore, Italy

[21] Appl. No.: 09/062,426

[22] Filed: Apr. 17, 1998

[51] Int. Cl.[6] ..................... G02C 1/08
[52] U.S. Cl. ............... 351/95; 351/99; 351/100
[58] Field of Search ............. 351/83, 86, 90–101

[56] References Cited

U.S. PATENT DOCUMENTS

| | | | |
|---|---|---|---|
| Re. 3,725 | 11/1869 | Noel | 351/95 |
| 1,109,285 | 9/1914 | Haase | 351/99 |
| 1,955,690 | 4/1934 | Spill | 351/95 |

*Primary Examiner*—Huy Mai
*Attorney, Agent, or Firm*—Herbert Dubno; Andrew Wilford

[57] ABSTRACT

An eyeglass frame has a pair of at least limitedly flexible upper arms and a pair of respective at least limitedly flexible lower arms. Each arm has an inner end and an outer end and a bridge interconnects the inner ends so that each upper arm forms with the respective lower arm to a respective side of the bridge a seat for a lens. Respective pairs of elastically deformable elements have front ends fixed to the outer ends of the arms and rear ends fixed to a respective temple support with each pair of elements biasing the respective upper and lower arm toward each other so that the lens is gripped elastically in the seat. A respective temple is pivoted on each of the temple supports. A pair of eyeglasses is assembled from such a frame and a pair of lenses by first displacing each upper arm away from the respective lower arm with elastic deformation of the respective elements until the respective seats are wide enough to accept a respective lens. Then the respective lenses are figged to the widened seats and the upper and lower arms are released so that same elastically engage edges of the lenses while leaving a gap between outer ends of the upper and lower arms.

9 Claims, 3 Drawing Sheets

EYEGLASS FRAME AND METHOD OF MOUNTING LENS THEREIN

FIELD OF THE INVENTION

The present invention relates to an eyeglass frame. More particularly this invention concerns such a frame and a method of mounting lenses therein.

BACKGROUND OF THE INVENTION

A normal eyeglass frame comprises a central bridge or nose piece, a pair of upper lens-holding arms, and a pair of lower lens-holding arms that together with the respective upper arms embrace and hold respective lenses. While the inner ends of the arms are secured to each other or to the nose piece, and in fact can be joined unitarily together so that in effect each upper and the respective lower arms are simply sections of the same U-section wire, the outer ends are normally joined together at a front tube. To form this structure the outer end of each lower arm is normally formed with a threaded hole and the outer end of the upper arm with an unthreaded hole, so that a screw can be inserted through these two ends to secure them together and lock the respective lens solidly between the arms, bringing the outer arm ends into solid engagement with one another.

Somewhat behind each front tube formed by or secured to the outer arms ends there are two extensions that form a second pair of eyes or rear tube to which the front end of the respective temple is mounted. To this end the temple end is normally inserted between the two rear eyes, one of which is threaded, and another screw is inserted through them, forming a pivot for the temple. Thus at each side of the frame there are two tiny screws, one of which locks the two arms around the respective lens and the other of which acts at the pivot for the respective temple piece.

To assemble such a frame both screws must be withdrawn and the lens-holding arms spread since the frames are often marketed to the optician with dummy lenses that give the customers realistic glasses to try on and that hold the shape of the frames. The customer's prescription lenses are fitted between the respective arms and the front screws are driven home while the technician carefully holds the arms together to retain the lens in place until the screw is seated. Then the temples are set in place and the rear screw is installed.

This is obviously a cumbersome process. It is necessary to keep track of the tiny screws and various parts of the frame during assembly. Special tools are needed so that it is normally not considered practical for the consumer to change lenses himself or herself. Another disadvantage is that the frame and lenses must be a perfect fit; if the lenses are too small they will not be gripped tightly and will fall out even when the respective screw is tightened all the way down and if they are too big the outer arm ends will not meet so they cannot be screwed together.

In addition such a frame is relatively expensive to manufacture. It has numerous parts that must be accurately formed and machined, and tiny screwthreads must even be cut into some of them. What is more, in use it is fairly common for the screws to work loose, allowing the lenses to drop out and the screws to get lost, requiring professional repair.

OBJECTS OF THE INVENTION

It is therefore an object of the present invention to provide an improved eyeglass frame and assembly method.

Another object is the provision of such an improved eyeglass frame and assembly method which overcomes the above-given disadvantages, that is which is so simple that even an end user can readily change lenses, for instance to convert the eyeglasses from clear to tinted lenses.

A further object is to provide a frame that is somewhat tolerant of an imperfect fit of the lens, solidly holding a lens that is slightly too big or slightly too small.

SUMMARY OF THE INVENTION

An eyeglass frame has according to the invention a pair of at least limitedly flexible upper arms and a pair of respective at least limitedly flexible lower arms. Each arm has an inner end and an outer end and a bridge interconnects the inner ends so that each upper arm forms with the respective lower arm to a respective side of the bridge a seat for a lens. Respective pairs of elastically deformable elements have front ends fixed to the outer ends of the arms and rear ends fixed to a respective temple support with each pair of elements biasing the respective upper and lower arm toward each other so that the lens is gripped elastically in the seat. A respective temple is pivoted on each of the temple supports.

A pair of eyeglasses is assembled from such a frame and a pair of lenses by first displacing each upper arm away from the respective lower arm with elastic deformation of the respective elements until the respective seats are wide enough to accept a respective lens. Then the respective lenses are fitted to the widened seats and the upper and lower arms are released so that same elastically engage edges of the lenses while leaving a gap between outer ends of the upper and lower arms.

Thus with this arrangement it is possible to spread the seats holding the lenses without the use of tools to remove and replace the lenses. It is not necessary to withdraw, keep track of, and reinstall a tiny screw that can only be manipulated with a jeweler's screwdriver. In fact the operation is so simple and easy that the user can himself or herself switch lenses, for instance going from clear to tinted lenses as desired.

The element according to the invention is a spring-steel wire and the elements of each pair of elements diverge away from the respective temple support. This leaves a gap at the outer edge of each lens, so that even if a lens is a little too big or small, it will be held securely.

Each support in accordance with the invention is a tube fitted with a screw retaining the respective temple. In addition each temple has a forward extension and cross piece engageable laterally with the respective pair of elements forward of the respective support. Thus temples can be changed in the standard manner and in fact stock temples can be used if necessary.

In accordance with the invention respective clips are engaged around the pairs of elements and urge same toward each other and thereby urge the respective arms toward each other. These clips are each slidable along the respective pair of elements and are C-shaped. Such clips ensure a very solid holding, but constitute a part that cannot be separated from the frame so that even if the lenses need to be changed, there is no possibility of loosing a critical part of the frames.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
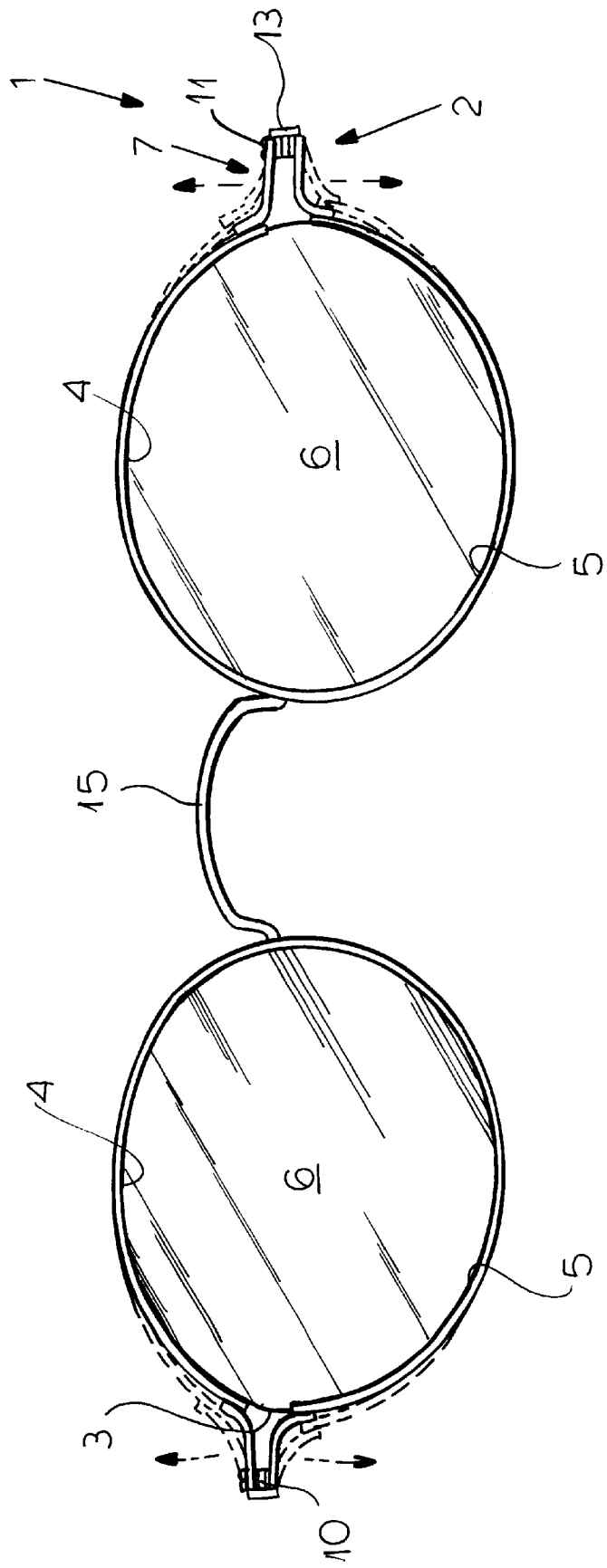
FIG. 1 is a front view of a pair of eyeglasses according to the invention.

As seen in FIG. 1 a pair of eyeglasses basically comprises a frame 1 each side of which comprises an upper arm or wire 4 and a lower arm or wire 5 that together form an oval seat for a respective lens 6. The arms 4 and 5 are joined together at a central bridge 15 and each upper arm 4 and the respective lower arm 5 in fact form curved portions of a common U-section metal wire. Outer ends of the lenses 6 the arms 4 and 5 are separated by a gap 3.

Figure 4:
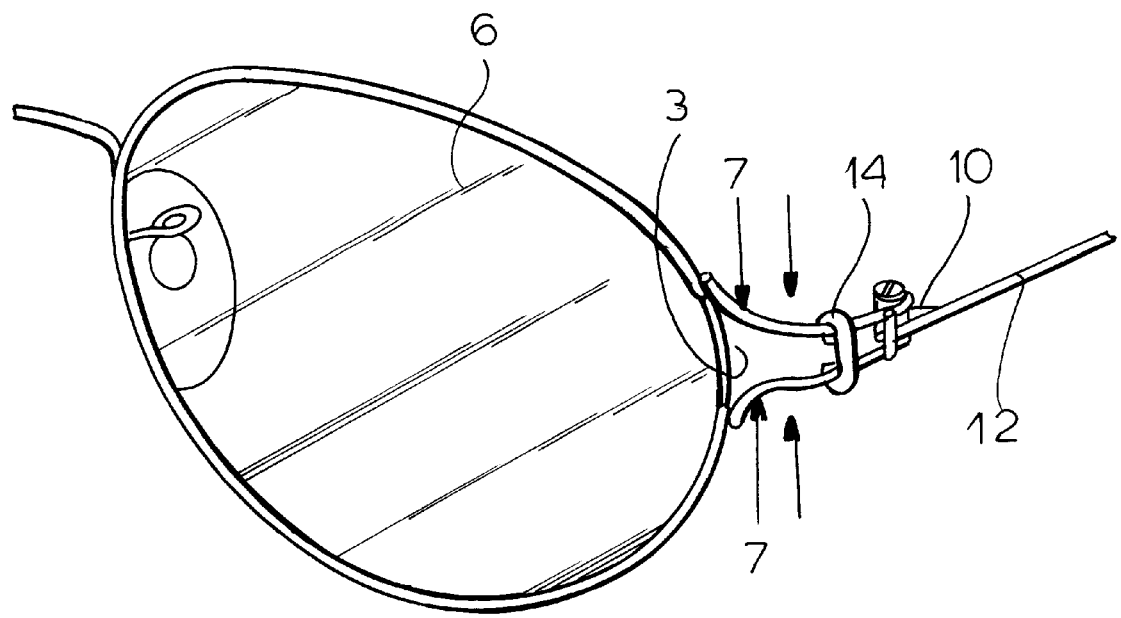

The arms 4 and 5 are secured together by a retaining assembly 2 formed by a pair of spring-steel elements or wires 7 that each have a front end 8 welded to the outer end of a respective one of the arms 4 and 5 and a rear end 9 welded to a tube 10, with the two elements 7 on each side diverging vertically from each other toward the front. These wires 7 are elastically deformable and normally hold the two arms 4 and 5 in the position of FIG. 1, that is relatively closely juxtaposed and gripping upper and lower edges of the lenses 6 but with the outer arm ends separated by the space 3. As shown in FIG. 4, in the fully assembled condition a C-shaped clip 14 is engaged around the wires 7 to hold them in the position they elastically return to under normal circumstances.

The tube 10, which actually can be formed as a pair of eyes, is traversed by a standard screw 11 that also goes through the mounting eye of a respective temple wire 12. A crosspiece 13 on the front end of each temple 12 engages the wires 7 to act as a pivot stop for the temple 12.

Figure 2:
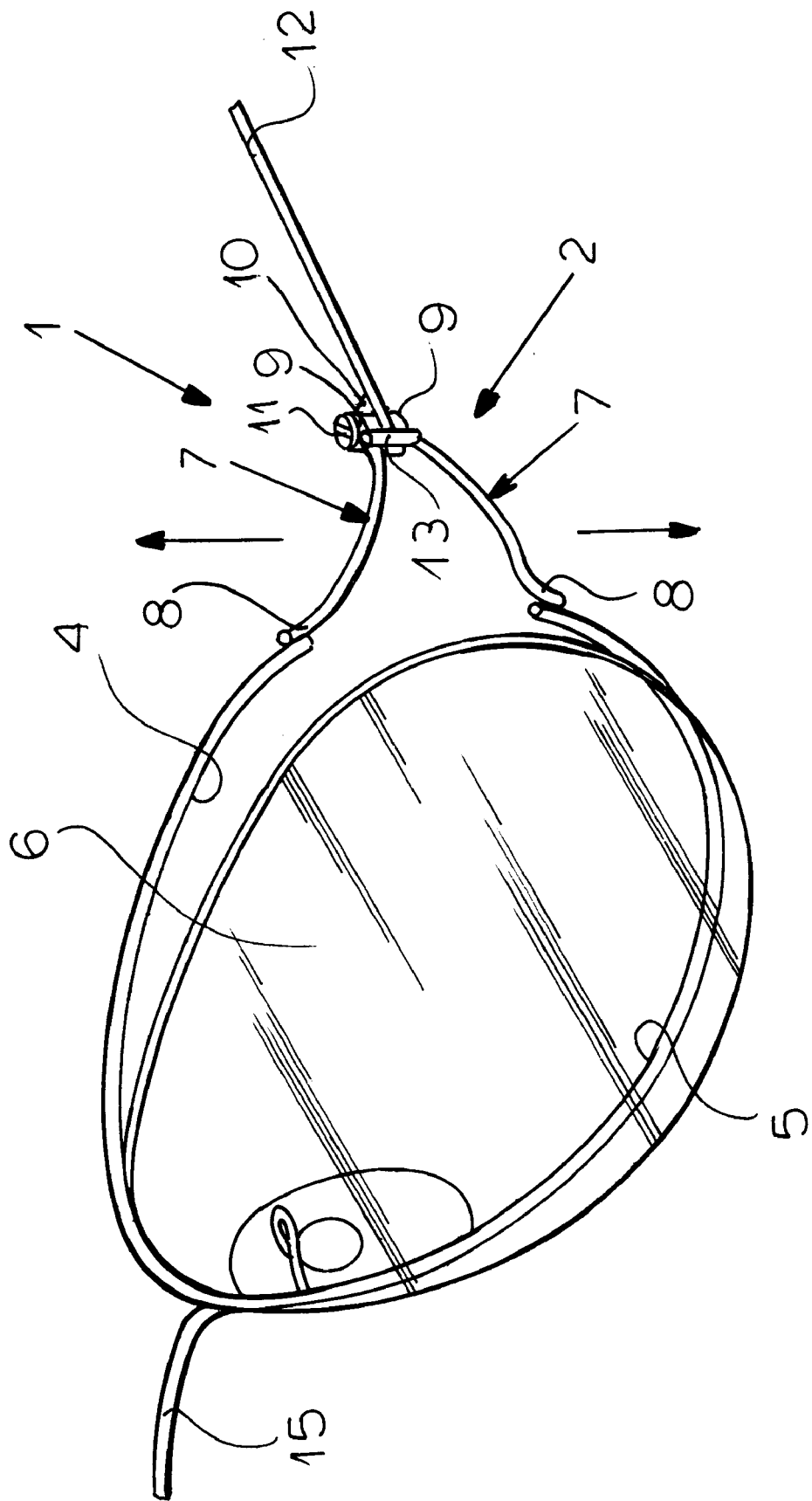
FIG. 2 is a larger-scale perspective view of a portion of the frame in a first step of the assembly process.
Figure 3:
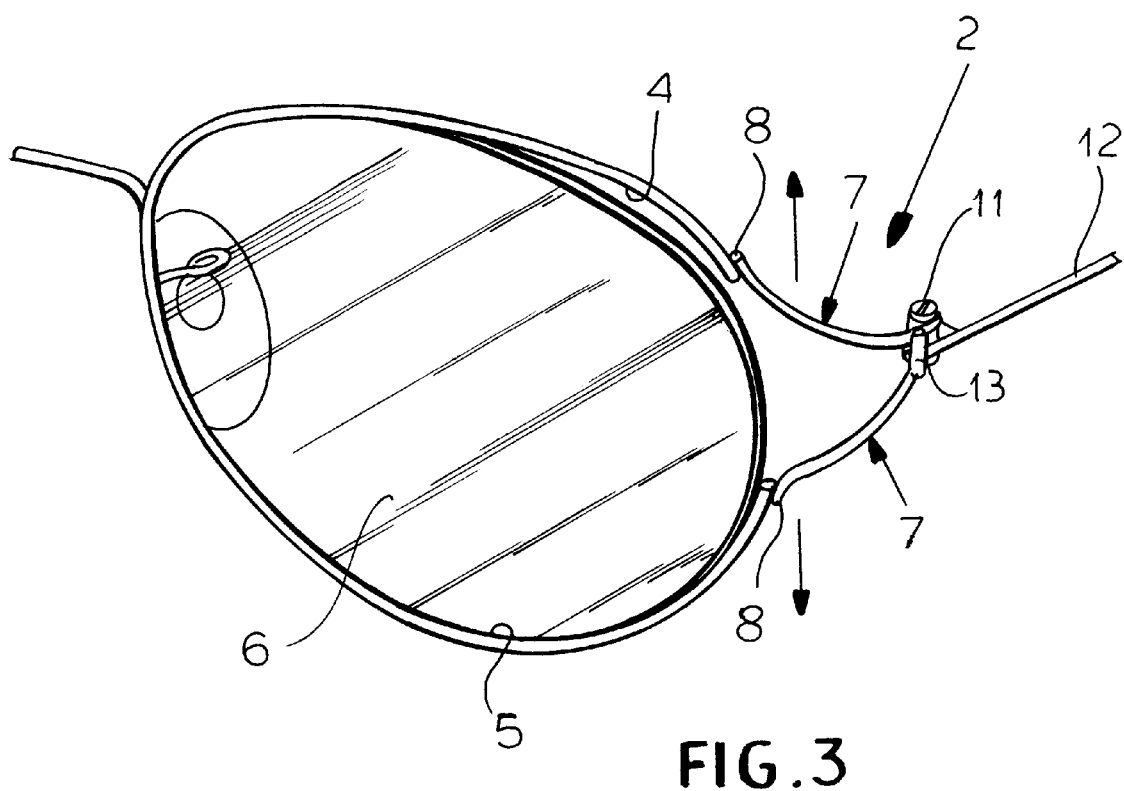
FIGS. 3 and 4 are views like FIG. 2 showing the glasses in second and final steps of the assembly process.

To fit lenses to the frame 1 the first step as shown in FIG. 2 is to spread the arms 4 and 5, with elastic deformation of the wires 7, enough that the lens 6 can be fitted between them. This of course is done after removing the clip 14 if necessary. As soon as the arms 4 and 5 are released, they will return roughly to the position of FIG. 3, gripping the lens 6 and retaining it in place.

Then the clip 14 is installed and slid forward to solidly lock the assembly together. These steps are then repeated for the other lens 6.

I claim:

1. An eyeglass frame comprising:
   a pair of at least limitedly flexible upper arms and a pair of respective at least limitedly flexible lower arms, each arm having an inner end and an outer end;
   a bridge interconnecting the inner ends, each upper arm forming with the respective lower arm to a respective side of the bridge a seat for a lens;
   respective pairs of elastically deformable elements having front ends fixed to the outer ends of the arms and rear ends;
   respective clips engaged around the pairs of elements and urging same toward each other and thereby urging the respective arms toward each other;
   a respective temple support fixed to the rear ends of each pair of elements, each pair of elements biasing the respective upper and lower arm toward each other, whereby the lens is gripped elastically in the seat; and
   a respective temple pivoted on each of the temple supports.

2. The eyeglass frame defined in claim 1 wherein each element is a spring-steel wire.

3. The eyeglass frame defined in claim 2 wherein the elements of each pair of elements diverge away from the respective temple support.

4. The eyeglass frame defined in claim 1 wherein each support is a tube fitted with a screw retaining the respective temple.

5. The eyeglass frame defined in claim 4 wherein each temple has a forward extension and cross piece engageable laterally with the respective pair of elements forward of the respective support.

6. The eyeglass frame defined in claim 1 wherein each clip is slidable along the respective pair of elements.

7. The eyeglass frame defined in claim 6 wherein each clip is C-shaped.

8. A method of installing a lens into an eyeglass frame having
   a pair of at least limitedly flexible upper arms and a pair of respective at least limitedly flexible lower arms, each arm having an inner end and an outer end;
   a bridge interconnecting the inner ends, each upper arm forming with the respective lower arm to a respective side of the bridge a seat for a lens;
   respective pairs of elastically deformable elements having front ends fixed to the outer ends of the arms and rear ends;
   a respective temple support fixed to the rear ends of each pair of elements, each pair of elements biasing the respective upper and lower arm toward each other, whereby the lens is gripped elastically in the seat;
   respective clips engaged around the pairs of elements; and
   a respective temple pivoted on each of the temple supports, the method comprising the steps of sequentially
   pushing the clips back on the elements;
   displacing each upper arm away from the respective lower arm with elastic deformation of the respective elements until the respective seats are wide enough to accept a respective lens;
   fitting the respective lenses to the widened seats;
   releasing the upper and lower arms so that same elastically engage edges of the lenses while leaving a gap between outer ends of the upper and lower arms; and
   pushing the clips forward on the element, whereby the pushed-forward clips press the elements toward each other and thereby press the upper and lower arms vertically toward each other.

9. An eyeglass frame comprising:
   a pair of at least limitedly flexible upper arms and a pair of respective at least limitedly flexible lower arms, each arm having an inner end and an outer end;
   a bridge interconnecting the inner ends, each upper arm forming with the respective lower arm to a respective side of the bridge a seat for a lens;
   respective pairs of elastically deformable elements having front ends fixed to the outer ends of the arms and rear ends;
   a respective temple support formed as a tube fixed to the rear ends of each pair of elements and fitted with a screw, each pair of elements biasing the respective upper and lower arm toward each other, whereby the lens is gripped elastically in the seat; and
   a respective temple pivoted on each of the screws of the temple supports.

* * * * *

UNITED STATES PATENT AND TRADEMARK OFFICE
CERTIFICATE OF CORRECTION

PATENT NO. : 5,940,164
DATED     : August 17, 1999
INVENTOR(S) : Gianni DEPPI

It is certified that error appears in the above-identified patent and that said Letters Patent is hereby corrected as shown below:

On the title page,
-- [30] Foreign Application Priority Data
Apr. 18, 1997 [IT] Italy ....... MI97A 000903 --.

Signed and Sealed this

First Day of August, 2000

Q. TODD DICKINSON

*Attest:*

*Attesting Officer*  *Director of Patents and Trademarks*